United States Patent
Soriano

(10) Patent No.: US 11,095,144 B2
(45) Date of Patent: Aug. 17, 2021

(54) WIRELESS CHARGING CRADLE

(71) Applicant: Ricardo Soriano, Chino, CA (US)

(72) Inventor: Ricardo Soriano, Chino, CA (US)

( * ) Notice: Subject to any disclaimer, the term of this patent is extended or adjusted under 35 U.S.C. 154(b) by 48 days.

(21) Appl. No.: 16/184,063

(22) Filed: Nov. 8, 2018

(65) Prior Publication Data

US 2020/0153266 A1    May 14, 2020

(51) Int. Cl.
*H02J 7/02* (2016.01)
*H02J 7/00* (2006.01)

(52) U.S. Cl.
CPC ............... *H02J 7/025* (2013.01); *H02J 7/00* (2013.01); *H02J 7/0045* (2013.01); *H02J 7/027* (2013.01)

(58) Field of Classification Search
CPC ....................................................... H02J 7/025
USPC ............................................................ 320/108
See application file for complete search history.

(56) References Cited

U.S. PATENT DOCUMENTS

| | | | |
|---|---|---|---|
| 5,305,980 A | 4/1994 | Le Blanc | |
| 5,647,486 A | 7/1997 | Wilen | |
| D409,200 S | 5/1999 | Cooper | |
| 6,525,266 B2 | 2/2003 | Ferland | |
| 6,879,254 B1 | 4/2005 | Graham | |
| 7,461,421 B1 | 12/2008 | Faircloth | |
| 9,310,020 B1* | 4/2016 | Bernards | F16M 11/041 |
| 9,577,694 B1* | 2/2017 | Albee | H04B 1/3877 |
| 9,673,851 B2* | 6/2017 | Pelster | G06F 1/1632 |
| 2006/0214630 A1* | 9/2006 | Huang | H02J 7/0045 320/112 |
| 2013/0169058 A1* | 7/2013 | Chen | H01F 38/14 307/104 |
| 2015/0015180 A1* | 1/2015 | Miller | H02J 7/0042 320/103 |
| 2015/0194839 A1* | 7/2015 | Wojcik | H01M 10/46 320/108 |
| 2015/0288204 A1* | 10/2015 | Weinstein | H01M 10/46 320/107 |
| 2016/0118841 A1* | 4/2016 | Makwinski | H04B 5/0037 320/108 |
| 2016/0344223 A1* | 11/2016 | Lee | H02J 7/025 |
| 2018/0062417 A1* | 3/2018 | Choi | H02J 7/0045 |
| 2018/0123361 A1* | 5/2018 | Gray | H02J 7/0021 |
| 2018/0288898 A1* | 10/2018 | Jeong | G06F 1/1632 |

* cited by examiner

*Primary Examiner* — Edward Tso
*Assistant Examiner* — Ahmed H Omar

(57) ABSTRACT

A wireless charging cradle for stowing and charging an electronic device includes a block that is resiliently compressible. A recess is positioned in an upper face of the block and is configured to position an electronic device of a user. A battery is selectively positionable in a slot that extends into a front of the block. A wireless charging pad is coupled to the block and is positioned at a lower end of the recess. The wireless charging pad is operationally coupled to the battery and is configured to charge the electronic device that is positioned in the recess.

16 Claims, 5 Drawing Sheets

WIRELESS CHARGING CRADLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to charging cradles and more particularly pertains to a new charging cradle for stowing and charging an electronic device.

BRIEF SUMMARY OF THE INVENTION

An embodiment of the disclosure meets the needs presented above by generally comprising a block that is resiliently compressible. A recess is positioned in an upper face of the block and is configured to position an electronic device of a user. A battery is selectively positionable in a slot that extends into a front of the block. A wireless charging pad is coupled to the block and is positioned at a lower end of the recess. The wireless charging pad is operationally coupled to the battery and is configured to charge the electronic device that is positioned in the recess.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
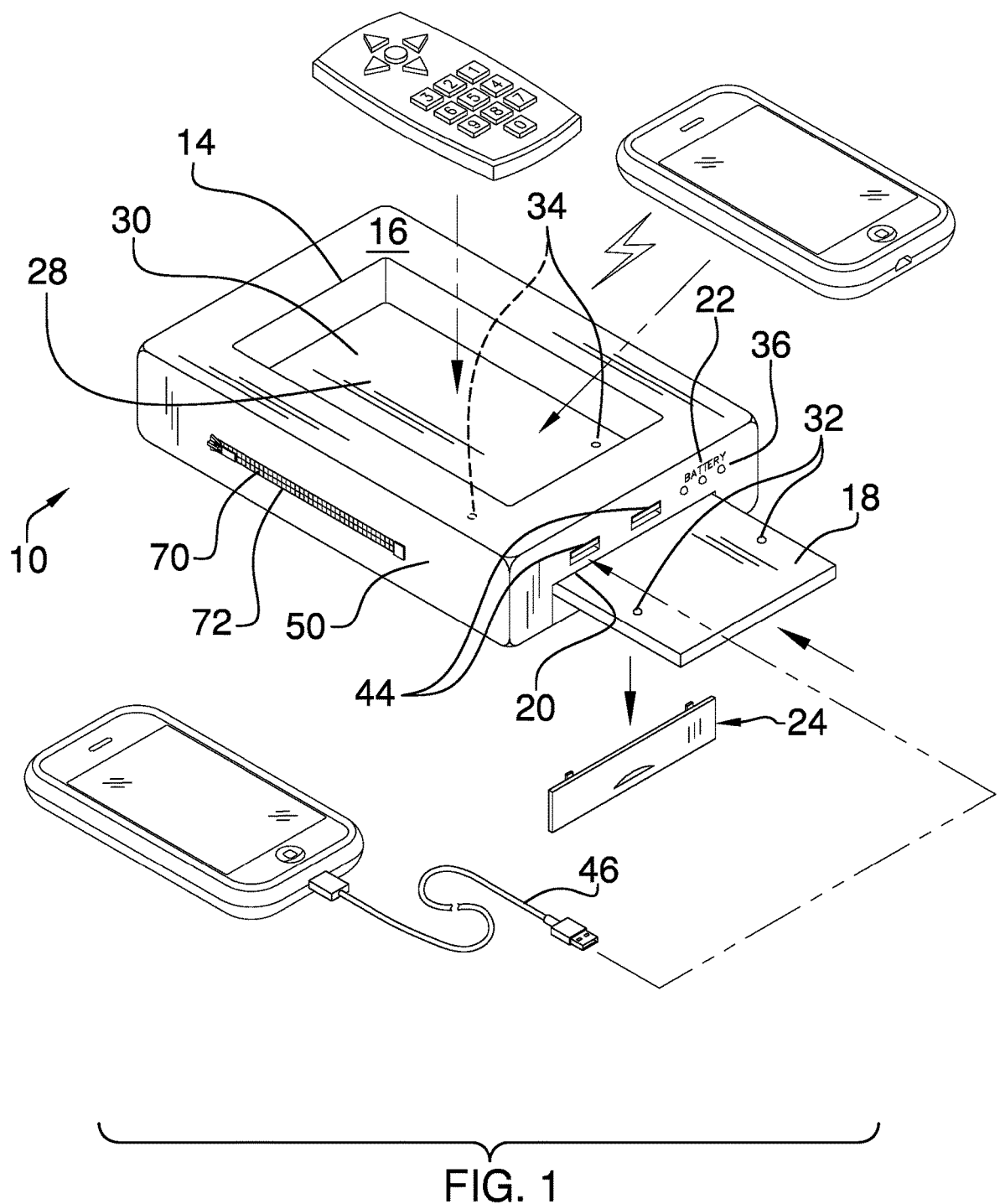
FIG. 1 is an isometric perspective view of a wireless charging cradle according to an embodiment of the disclosure.
Figure 2:
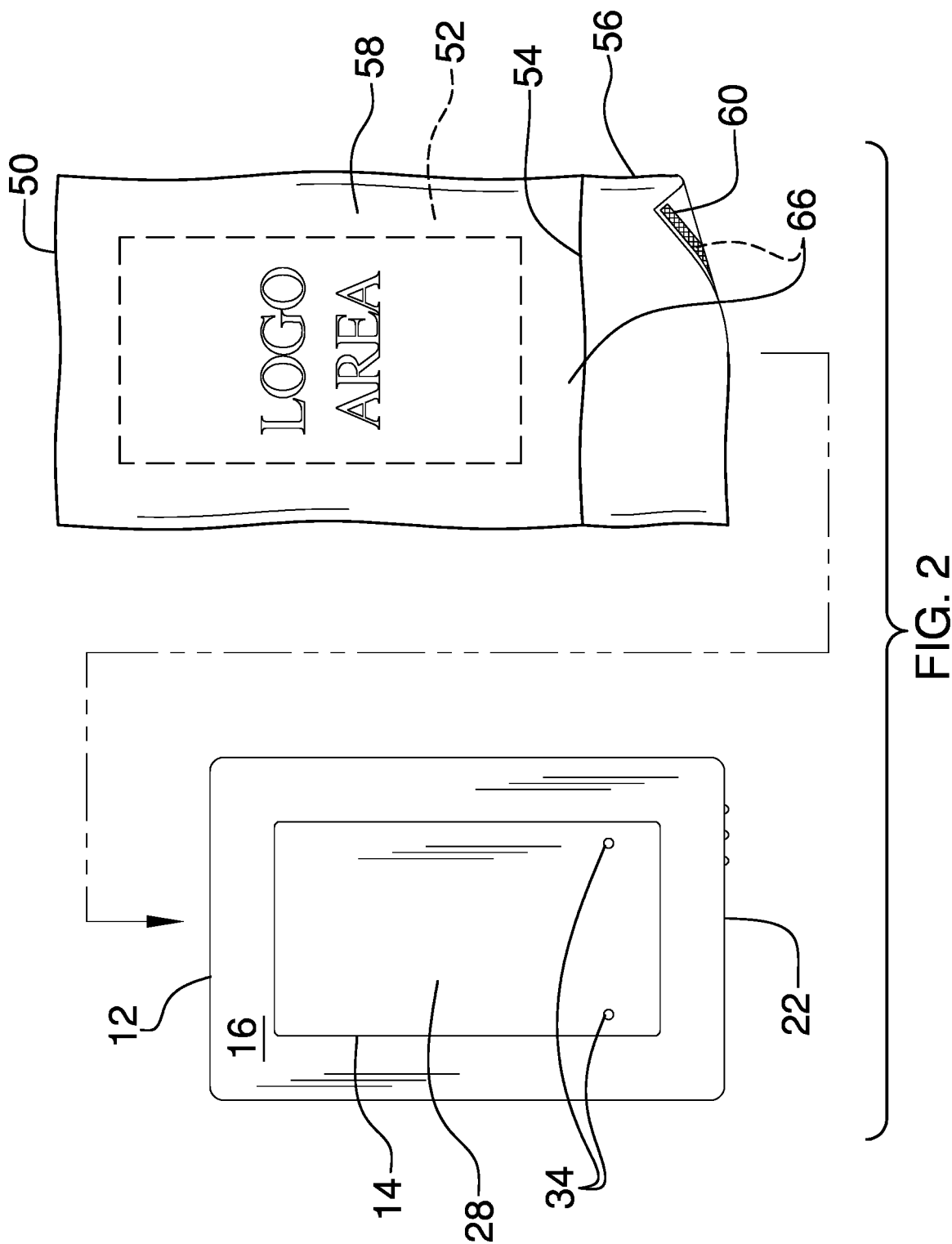
FIG. 2 is a top view of an embodiment of the disclosure.
Figure 3:
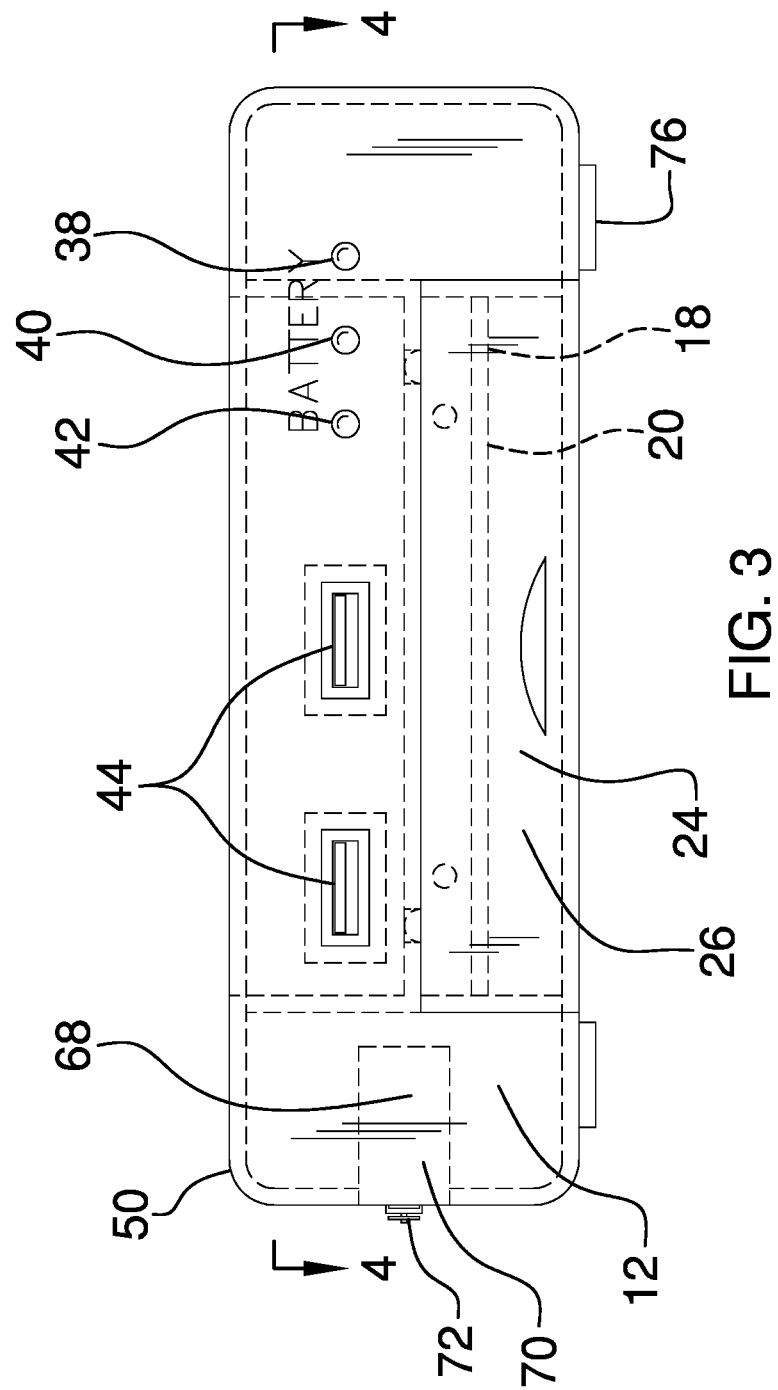
FIG. 3 is a front view of an embodiment of the disclosure.
Figure 4:
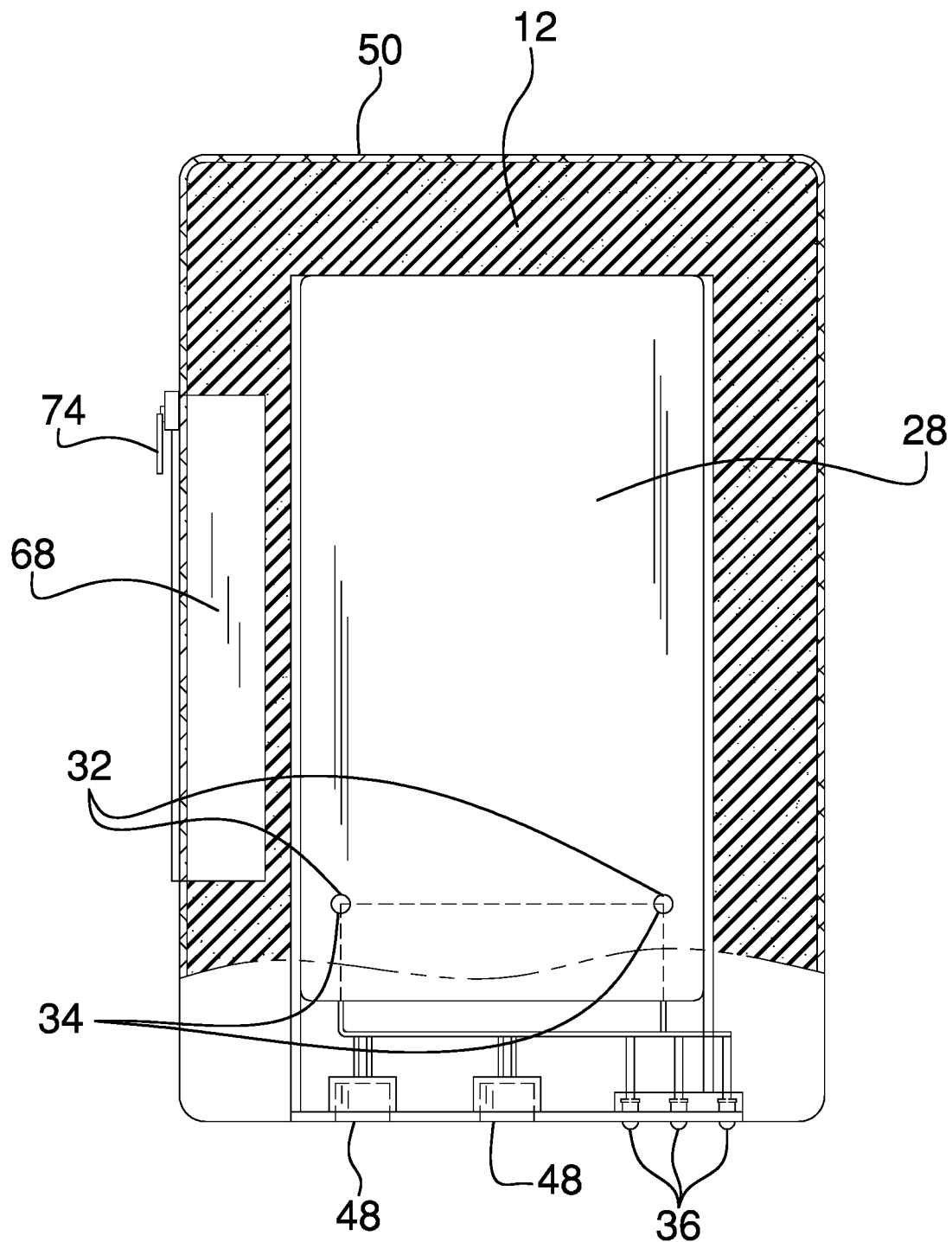
FIG. 4 is a cross-sectional view of an embodiment of the disclosure.
Figure 5:
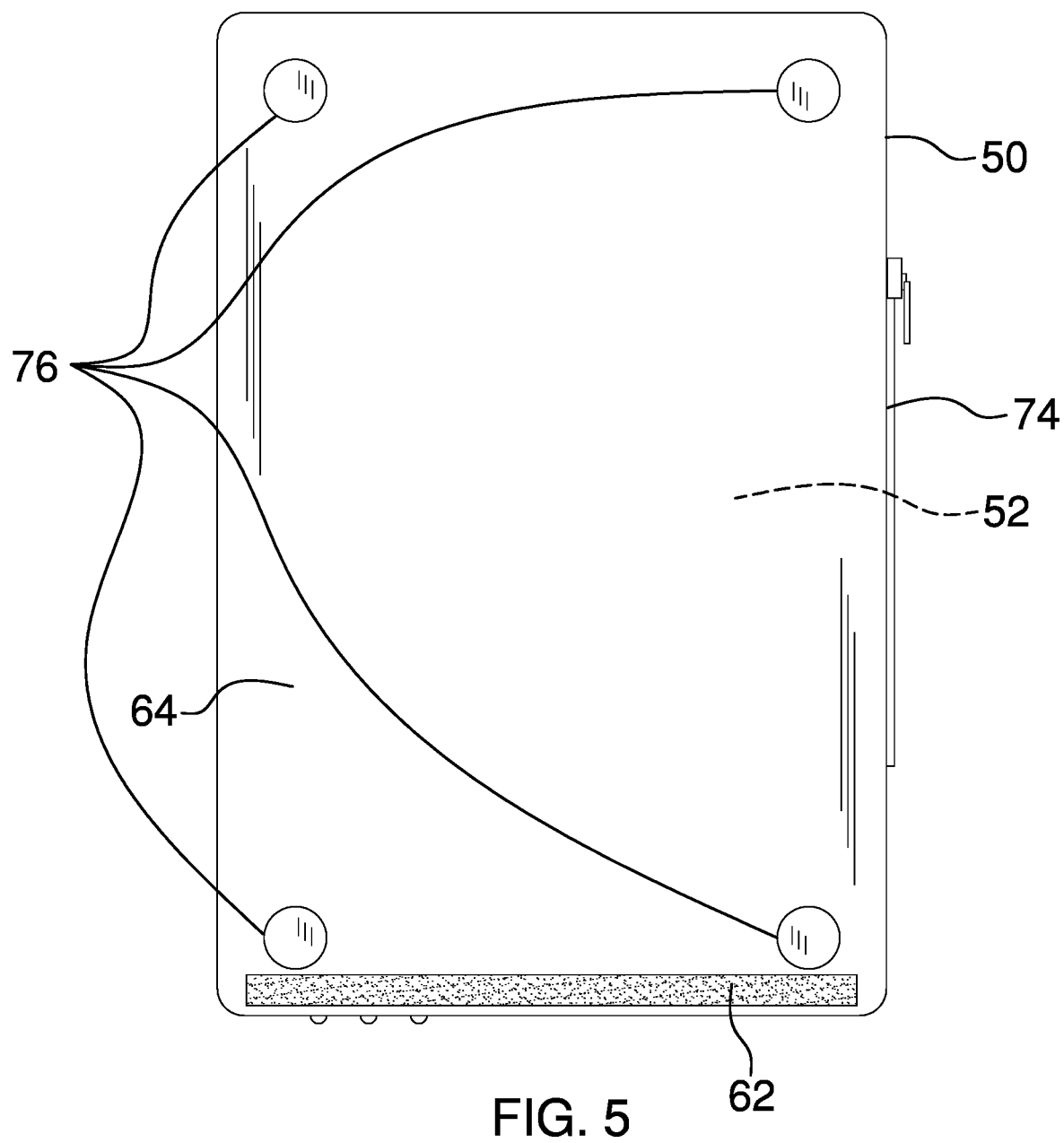
FIG. 5 is a bottom view of an embodiment of the disclosure.

With reference now to the drawings, and in particular to FIGS. 1 through 5 thereof, a new charging cradle embodying the principles and concepts of an embodiment of the disclosure and generally designated by the reference numeral 10 will be described.

As best illustrated in FIGS. 1 through 5, the wireless charging cradle 10 generally comprises a block 12 that is resiliently compressible. The block 12 comprises foamed elastomer and is rectangularly box shaped.

A recess 14 is positioned in an upper face 16 of the block 12 and is configured to position an electronic device of a user. The recess 14 is substantially rectangularly shaped when viewed from the upper face 16. The recess 14 is sized to insert more than one electronic device to be charged, such as a cellular phone and a remote control. This promotes organization and reduces clutter.

A battery 18 is selectively positionable in a slot 20 that extends into a front 22 of the block 12. A panel 24, which is complimentary to an opening 26 of the slot 20, is selectively couplable to the block 12 to close the opening 26.

A wireless charging pad 28 is coupled to the block 12 and is positioned at a lower end 30 of the recess 14. The wireless charging pad 28 is operationally coupled to the battery 18 and is configured to charge the electronic device that is positioned in the recess 14. The block 12 can be positioned conveniently to a user, such as proximate to a chair in a home, hospital, mall, or waiting room.

A pair of first nibs 32 is coupled to the battery 18. A pair of second nibs 34 is coupled to the wireless charging pad 28. Each second nib 34 is positioned to make electrical contact with an associated first nib 32 when the battery 18 is fully inserted into the slot 20 to operationally couple the battery 18 to the wireless charging pad 28.

An indicator 36 is coupled to the front 22 of the block 12 and is operationally coupled to the battery 18. The indicator 36 is configured to display a charge level of the battery 18. The indicator 36 comprises a green light emitting diode 38, a yellow light emitting diode 40, and a red light emitting diode 42. The green light emitting diode 38, the yellow light emitting diode 40, and the red light emitting diode 42 are configured to selectively illuminate to indicate a high charge level, a medial charge level, and a low charge level of the battery 18, respectively.

A plurality of connectors 44 is coupled to the front 22 of the block 12. The connectors 44 are operationally coupled to the battery 18. Each connector 44 is configured to connect to a respective charging cord 46 to operationally couple the battery 18 to an electronic device, through the respective charging cord 46, to charge the electronic device. The plurality of connectors 44 comprises two connectors 44, and each connector comprises a Universal Serial Bus port 48.

The charging cradle 10 also comprises a shell 50 that defines an interior space 52. The interior space 52 is complementarily to the block 12. The shell 50 has a first end 54 that is open and thus positioned to insert the block 12 into the interior space 52, positioning the shell 50 around the block 12 so that the shell 50 is configured to protect the block 12 from being soiled. The shell 50 comprises fabric and is designed to be removable so that it can be laundered.

A flap 56 is coupled to a top 58 of the shell 50 adjacent to the first end 54. The flap 56 is positioned to selectively close the first end 54. A first coupler 60 is coupled to the flap 56 distal from the shell 50. A second coupler 62 is coupled to a bottom 64 of the shell 50 adjacent to the first end 54. The second coupler 62 is complementary to the first coupler 60 and is positioned to selectively couple to the first coupler 60 to fixedly position the flap 56 over the first end 54 of the shell 50 to cover the front 22 of the block 12. The second coupler 62 and the first coupler 60 comprise a hook and loop fastener 66.

A cavity 68 positioned in a side of the block 12. A slit 70 is positioned in the shell 50 so that the slit 70 is aligned with the cavity 68 when the block 12 is positioned in the interior space 52. The slit 70 is configured to insert an article, such as a replacement battery for the electronic device, into the cavity 68. A closure 72, which comprises a zipper 74, is coupled to the shell 50 adjacent to the slit 70 and is positioned to selectively close the slit 70 to retain the article in the cavity 68.

A plurality of pads 76, each of which comprises rubber, is coupled to a bottom 64 of the shell 50. The pads 76 are configured to frictionally couple to a surface to prevent slippage of the block 12 along the surface.

In use, the battery 18 is positioned in the slot 20 and the panel 24 is coupled to the block 12 to close the opening 26. The electronic device of the user is positioned in the recess 14. The wireless charging pad 28 is configured to charge the electronic device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:
1. A wireless charging cradle comprising:
a block, the block being resiliently compressible;
a recess positioned in an upper face of the block, the recess being sized such that the recess is configured for insertion of more than one electronic device to be charged wherein the recess is configured for positioning an electronic device of a user;
a slot extending into a front of the block;
a battery selectively positionable in the slot; a wireless charging pad coupled to the block and positioned at a lower end of the recess, the wireless charging pad being operationally coupled to the battery wherein the wireless charging pad is configured for charging the electronic device positioned in the recess;
a shell defining an interior space, the interior space being complementarily to the block, the shell having a first end, the first end being open wherein the first end is positioned for inserting the block into the interior space positioning the shell around the block wherein the shell is configured for protecting the block from being soiled;
a cavity positioned in a side of the block;
a slit positioned in the shell such that the slit is aligned with the cavity when the block is positioned in the interior space wherein the slit is configured for inserting an article into the cavity;
a closure coupled to the shell adjacent to the slit wherein the closure is positioned for selectively closing the slit for retaining the article in the cavity.

2. The charging cradle of claim 1, further including the block comprising foamed elastomer.

3. The charging cradle of claim 1, further comprising:
the block being rectangularly box shaped; and
the recess being substantially rectangularly shaped when viewed from the upper face.

4. The charging cradle of claim 1, further including a panel complimentary to an opening of the slot, the panel being selectively couplable to the block for closing the opening.

5. The charging cradle of claim 1, further comprising:
a pair of first nibs coupled to the battery; and
a pair of second nibs coupled to the wireless charging pad wherein each second nib is positioned for contacting an associated first nib when the battery is fully inserted into the slot for operationally coupling the battery to the wireless charging pad.

6. The charging cradle of claim 1, further including an indicator coupled to the front of the block, the indicator being operationally coupled to the battery wherein the indicator is configured for displaying a charge level of the battery.

7. The charging cradle of claim 6, further including the indicator comprising a green light emitting diode, a yellow light emitting diode, and a red light emitting diode wherein the green light emitting diode, the yellow light emitting diode, and the red light emitting diode are configured for selectively illuminating for indicating a high charge level, a medial charge level, and a low charge level of the battery, respectively.

8. The charging cradle of claim 1, further including a plurality of connectors coupled to the front of the block, the connectors being operationally coupled to the battery wherein each connector is configured for connecting to a respective charging cord for operationally coupling the battery to an electronic device through the respective charging cord for charging the electronic device.

9. The charging cradle of claim 8, further including the plurality of connectors comprising two connectors.

10. The charging cradle of claim 8, further including each connector comprising a Universal Serial Bus port.

11. The charging cradle of claim 1, further including the shell comprising fabric.

12. The charging cradle of claim 1, further comprising:
a flap coupled to a top of the shell adjacent to the first end wherein the flap is positioned for selectively closing the first end;
a first coupler coupled to the flap distal from the shell; and
a second coupler coupled to a bottom of the shell adjacent to the first end, the second coupler being complementary to the first coupler wherein the second coupler is positioned for selectively coupling to the first coupler for fixedly positioning the flap over the first end of the shell for covering the front of the block.

13. The charging cradle of claim 12, further including the second coupler and the first coupler comprising a hook and loop fastener.

14. The charging cradle of claim 1, further including the closure comprising a zipper.

15. The charging cradle of claim 1, further including a plurality of pads coupled to a bottom of the shell, the pads comprising rubber wherein the pads are configured for frictionally coupling to a surface for preventing slippage of the block along the surface.

16. A wireless charging cradle comprising:
a block, the block being resiliently compressible, the block comprising foamed elastomer, the block being rectangularly box shaped;
a recess positioned in an upper face of the block, the recess being sized such that the recess is configured for insertion of more than one electronic device to be charged wherein the recess is configured for positioning an electronic device of a user, the recess being substantially rectangularly shaped when viewed from the upper face;
a slot extending into a front of the block;
a panel complimentary to an opening of the slot, the panel being selectively couplable to the block for closing the opening;
a battery selectively positionable in the slot;
a pair of first nibs coupled to the battery;
a wireless charging pad coupled to the block and positioned at a lower end of the recess, the wireless charging pad being operationally coupled to the battery wherein the wireless charging pad is configured for charging the electronic device positioned in the recess;
a pair of second nibs coupled to the wireless charging pad wherein each second nib is positioned for contacting an associated first nib when the battery is fully inserted into the slot for operationally coupling the battery to the wireless charging pad;
an indicator coupled to the front of the block, the indicator being operationally coupled to the battery wherein the indicator is configured for displaying a charge level of the battery, the indicator comprising a green light emitting diode, a yellow light emitting diode, and a red light emitting diode wherein the green light emitting diode, the yellow light emitting diode, and the red light emitting diode are configured for selectively illuminating for indicating a high charge level, a medial charge level, and a low charge level of the battery, respectively;
a plurality of connectors coupled to the front of the block, the connectors being operationally coupled to the battery wherein each connector is configured for connecting to a respective charging cord for operationally coupling the battery to an electronic device through the respective charging cord for charging the electronic device, the plurality of connectors comprising two connectors, each connector comprising a Universal Serial Bus port;
a shell defining an interior space, the interior space being complementarily to the block, the shell having a first end, the first end being open wherein the first end is positioned for inserting the block into the interior space positioning the shell around the block wherein the shell is configured for protecting the block from being soiled, the shell comprising fabric;
a flap coupled to a top of the shell adjacent to the first end wherein the flap is positioned for selectively closing the first end;
a first coupler coupled to the flap distal from the shell,
a second coupler coupled to a bottom of the shell adjacent to the first end, the second coupler being complementary to the first coupler wherein the second coupler is positioned for selectively coupling to the first coupler for fixedly positioning the flap over the first end of the shell for covering the front of the block, the second coupler and the first coupler comprising a hook and loop fastener;
a cavity positioned in a side of the block;
a slit positioned in the shell such that the slit is aligned with the cavity when the block is positioned in the interior space wherein the slit is configured for inserting an article into the cavity;
a closure coupled to the shell adjacent to the slit wherein the closure is positioned for selectively closing the slit for retaining the article in the cavity, the closure comprising a zipper; and
a plurality of pads coupled to a bottom of the shell, the pads comprising rubber wherein the pads are configured for frictionally coupling to a surface for preventing slippage of the block along the surface.

\* \* \* \* \*